M. M. BORDEN.
LIQUID RATE CONTROLLER.
APPLICATION FILED MAR. 3, 1915.
1,206,806.
Patented Dec. 5, 1916.
4 SHEETS—SHEET 1.
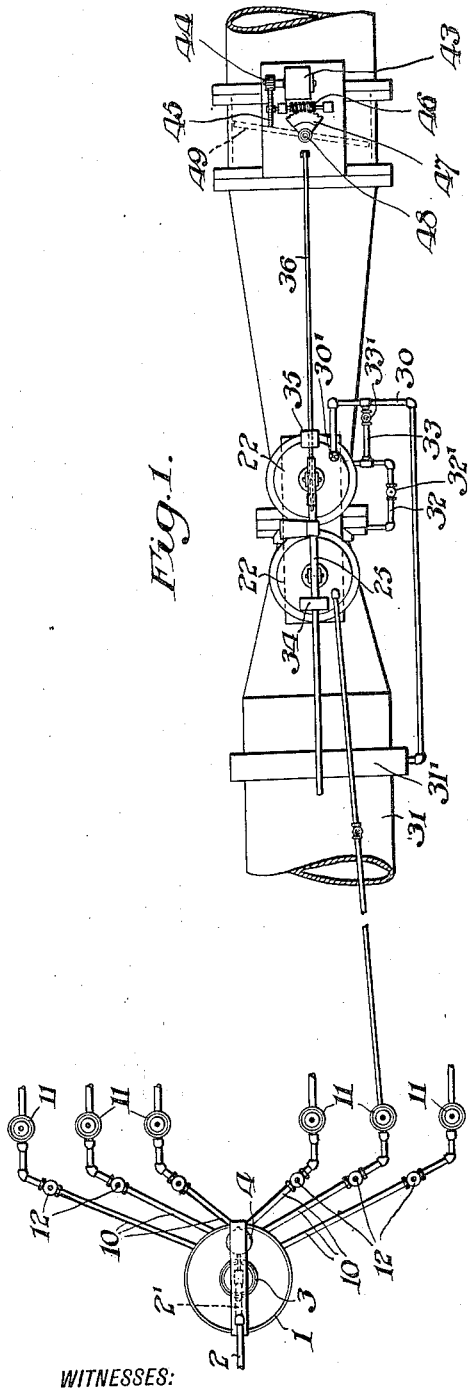
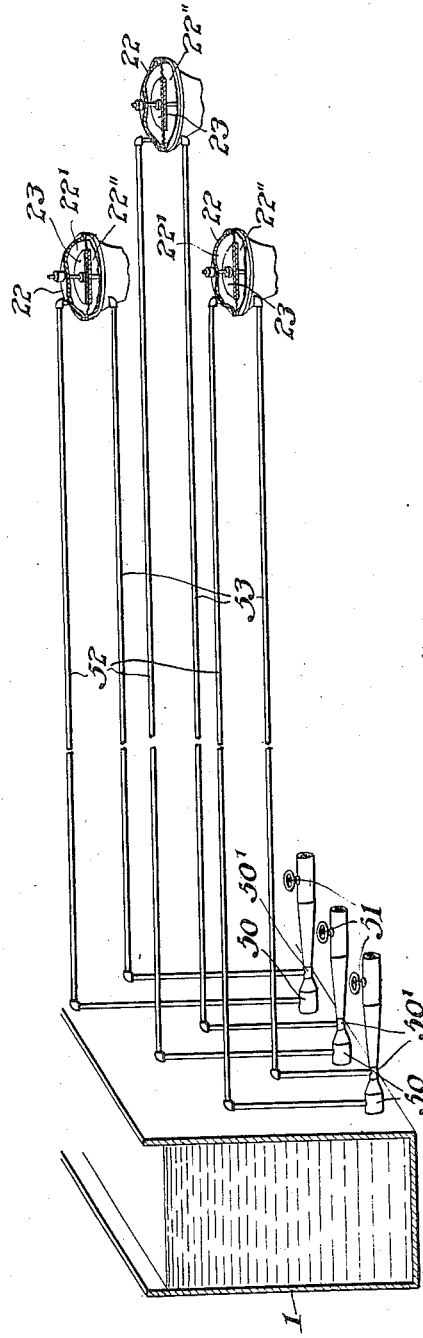
WITNESSES:
R. Schleicher
Jos. S. Dennis
INVENTOR:
Moro M. Borden,
BY
Charles N. Butler
ATTORNEY M. M. BORDEN.
LIQUID RATE CONTROLLER.
APPLICATION FILED MAR. 3, 1915.
1,206,806.
Patented Dec. 5, 1916.
4 SHEETS—SHEET 2.
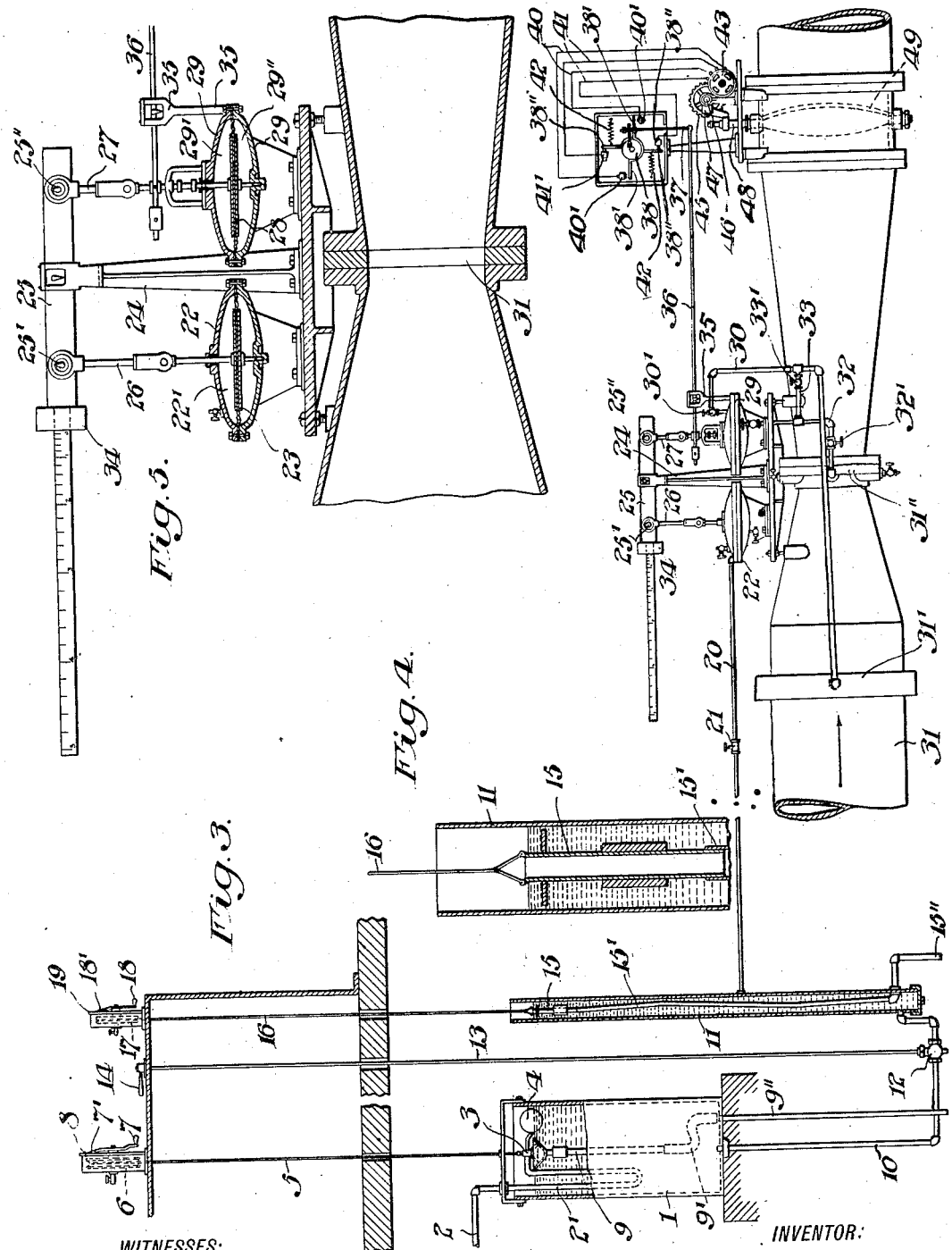
WITNESSES:
R. Schleicher
Jos. G. Denny
INVENTOR:
Moro M. Borden,
BY
Charles N. Butler.
ATTORNEY

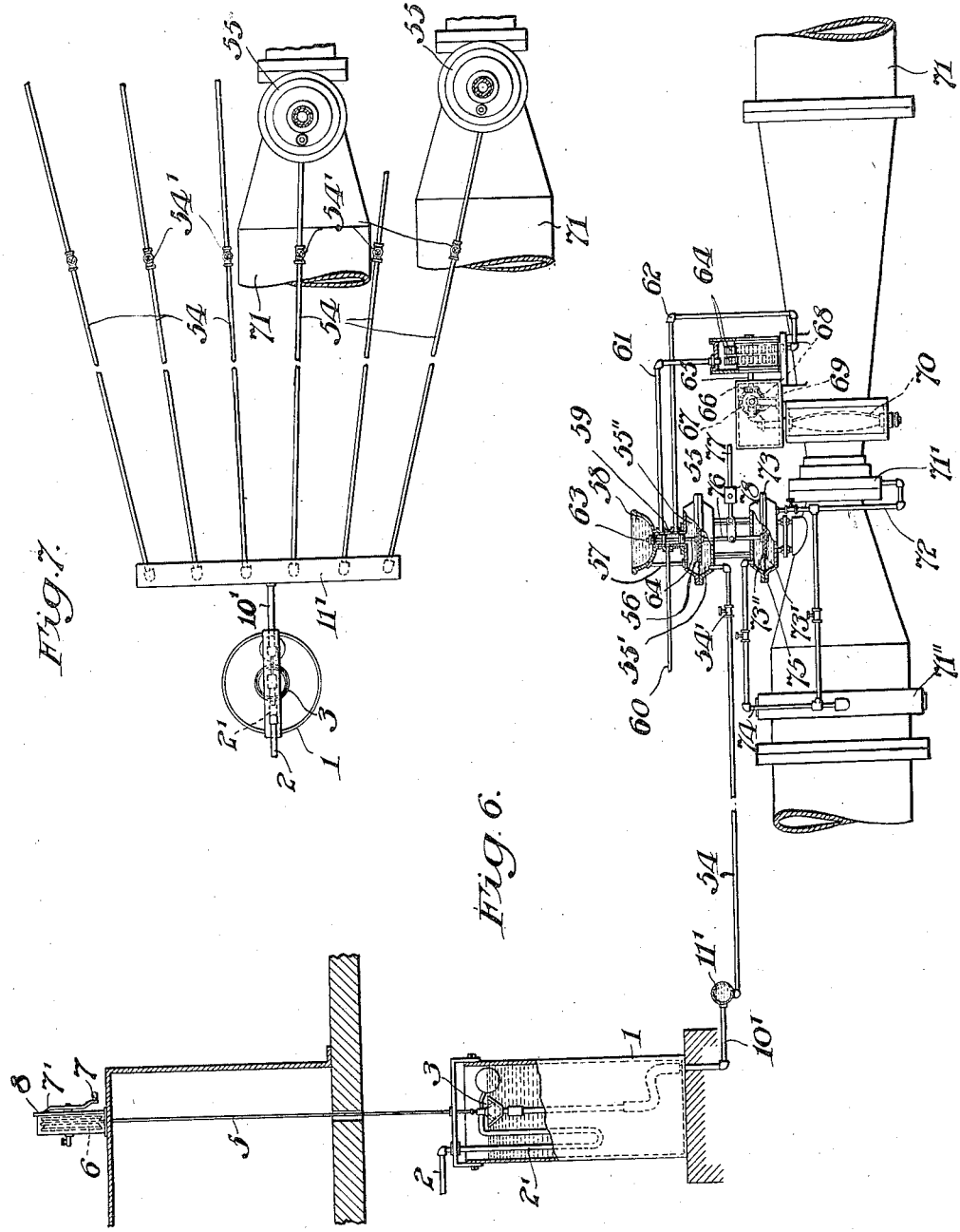

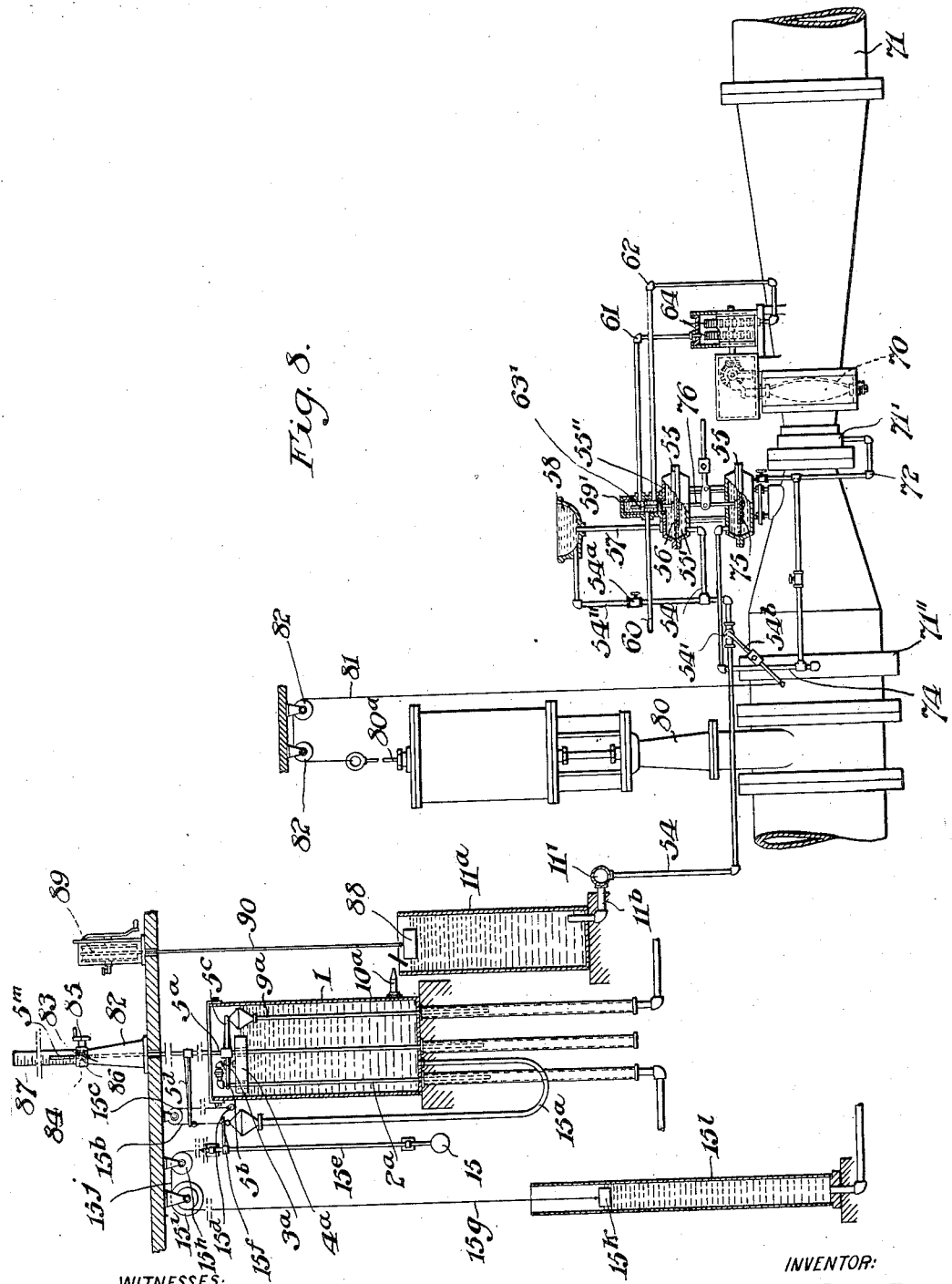

UNITED STATES PATENT OFFICE.

MORO M. BORDEN, OF COLLINGSWOOD, NEW JERSEY, ASSIGNOR TO SIMPLEX VALVE & METER COMPANY, OF PHILADELPHIA, PENNSYLVANIA, A CORPORATION OF NEW JERSEY.

LIQUID-RATE CONTROLLER.

1,206,806.  Specification of Letters Patent.  Patented Dec. 5, 1916.

Application filed March 3, 1915. Serial No. 11,799.

*To all whom it may concern:*

Be it known that I, MORO M. BORDEN, a citizen of the United States, residing at Collingswood, in the county of Camden and State of New Jersey, have invented certain Improvements in Liquid-Rate Controllers, of which the following is a specification.

My invention relates to the distribution of liquids, particularly water, and its primary object is to automatically control from a central point the flow through different conduits of a distribution system by mechanism that is sensitive, accurate, simple and reliable.

The nature and characteristic features of my invention will more fully appear by reference to the following description and the accompanying drawings in illustration thereof.

In the drawings, Figure 1 represents a plan view of a master controller, together with one of a set of mains having valve regulating mechanism controlled by the master controller; Fig. 2 is a diagrammatic sectional elevation representing a modified form of my invention; Fig. 3 is an irregular sectional elevation of a unit of the system; Fig. 4 is a broken section on an enlarged scale of a detail shown in Fig. 3; Fig. 5 is a part sectional elevation on an enlarged scale of differential pressure mechanism illustrated in Fig. 3; Fig. 6 is a sectional elevation representing a further modification in the construction; Fig. 7 is a diagrammatic part sectional plan view of a system embodying features illustrated in Fig. 6; and Fig. 8 is a sectional elevation of a modified arrangement by which a uniform supply to a system by several conduits is automatically maintained though conduits are cut out of the system.

The invention, in the form thereof illustrated in Figs. 1, 3, 4, and 5, comprises a system having a central tank 1 to which water flows through a pipe 2 (having a flexible section 2' within the tank) connected with a valve 3 which is controlled by a float 4, the float moving with changes in the level of liquid sustaining it in the tank to maintain a predetermined head therein. A cord or other tension member 5 connects the valve and float with a sheave 6 movable by a handle 7 provided with an indicator 7' which travels over a dial 8 whereby the position of the valve and float may be regulated. A waste or overflow pipe section 9 in the tank is connected by a flexible section 9' with the section 9", the section 9 being movable by its connection so that it can be adjusted to the level which it is desired to maintain.

Pipes 10 connect the bottom of the tank 1 with the bottoms of stand pipes or tanks 11 for the individual controllers, the pipes containing valves 12 controlled by rods 13 which are operated by handles 14 at approximately the elevation of the handle 7 above the tanks.

Each of the tanks 11 holds water which is maintained at a predetermined level by the inflow from its pipe 10 and the discharge through its outlet pipe section 15, which is adjustable in elevation by a cord or other tension member 16 connected with a sheave 17 operated by a handle 18 having a pointer 18' movable over a dial 19 to indicate the level, the section 15 being connected by the flexible section 15' with a section 15" exterior to the tank.

Pipes 20, containing respective waste and stop valves 21, connect the tanks 11, a substantial distance below the lowest operative level of the liquid therein, with respective chambers 22' of casings 22 each containing a diaphragm 23, each diaphragm thus carrying a predetermined weight or pressure. Standards 24 have scale beams 25 fulcrumed thereon and connected by pivots 25' and flexible rods 26 with the respective diaphragms 23 through suitable packing in the casings 22, the pressure on the diaphragms acting through the rods to pull down the beams. Each beam 25 is connected by the pivot 25", on the opposite side of the standard from the pivot 25', and a flexible rod 27, with a diaphragm 28 in a casing 29 containing pressure chambers 29' and 29", the casing being provided with suitable packing for the rod. A pipe 30 connects the chamber 29' with a normal section 31' of a conduit 31 and a pipe 32 connects the contracted or Venturi section 31" of the conduit with the chamber 29", the pipes being provided with the respective valves 30' and 32'. A neutralizing pipe 33 containing the valve 33' connects the pipes 30 and 32. A poise 34 is movable on the beam 25 to adjust the balancing mechanism.

A standard 35 on the casing 29 has fulcrumed thereon a beam 36 having a short arm flexibly connected with the rod 27 by the reciprocations of which such beam is rocked. The long arm of this beam is connected by a link 37 with a switch mechanism comprising, as shown, the rotary body 38 provided with the contact fingers 38′ and 38″ adapted for engaging the stationary contacts 40′ and 41′ of conductors 40 and 41, the contact fingers being normally held out of engagement with the stationary contacts by the springs 42.

A motor 43 is operated in reverse directions by closing the circuits of the respective conductors 40 and 41, the contacts 38′ and 40′ being out of engagement to open the circuit of the conductors 40 when the contacts 38″ and 41′ are engaged to close the circuit containing the conductors 41 and vice versa. The motor 43 acts through a pinion 44 on a spur wheel 45 fixed to a journaled worm shaft 46, and the worm shaft acts on a worm wheel segment 47 fixed to the shaft 48 of a butter-fly valve 49 in the conduit 31.

It will be understood that, in operation, the liquid flowing in the respective mains 31 will communicate differential pressures through the open pipes 30 and 32 to the chambers 29′ and 29″, the valves 33′ being closed. Changes in the velocity of flow in the conduits will change the resultant pressures acting on the respective diaphragms 28 which will move subject to the influences of the respective diaphragms 23 acting through the parts 25, 26, and 27, the diaphragms 23 moving with or against the pressure communicated thereto from the tanks 11 through the pipes 20. As the head in each tank 11 can be regulated from a central point by regulating the elevation of the respective overflow devices 15, the actions of the respective diaphragms located at different places in the system may thus be controlled from such central point. The desired regulations having been imposed upon the respective diaphragms 23, the actions of the respective diaphragms 28 are regulated thereby, the movements of the latter diaphragms being communicated through the parts 27, 36 and 37 to the switch body 38. The movement of a switch in opposite directions, due to the reciprocations of the diaphragm 28 with the rise and fall of the velocity of flow in the corresponding conduit 31, closes and opens the circuits of the respective conductors 40 and 41 alternately, whereby the corresponding motor 43 is operated in opposite directions, the motor acting through the parts 44, 45, 46, 47, and 48 to rock the valve 49 as may be required to control the rate of flow through the conduit 31.

The mechanism may be varied, as illustrated in Fig. 2. Here the tank 1, in which liquid is maintained at a desired level, has, near its bottom, outlet pipes 50 containing the Venturi sections 50′ and provided with the valves 51, by which the flow in the respective pipes can be varied. The respective pipes 22 have their chambers diaphragm casings 22 have their chambers diaphragms 23 connected by 22′ above the diaphragms 23 connected by 22′ above the diaphragms 23 connected by pipes 52 with normal sections of the respective pipes 50 and their chambers 22″ below the diaphragms connected by the pipes 53 with the contracted or Venturi sections 50′ of the pipes 50, the diaphragms being thereby subjected to and movable under a constant resultant pressure or load which may be varied at the central point by regulating the respective valves 51. As the resistance to the movements of the diaphragms 23 regulates the mechanism for moving the valves 49, as previously described, it will be seen that the movements of the valves, located at different points in the system, may be thus regulated.

The mechanism may be varied further and simplified as illustrated in Figs. 6 and 7 in which the tank 1 containing liquid maintained at a predetermined level is connected by a pipe 10′ with a header 11′ adapted to have any number of pipes 54, containing regulating valves 54′, connected therewith and with casings 55. The latter contain diaphragms 56 forming chambers 55′ with which the pipes 54 communicate and chambers 55″ which communicate through pipes 57 with basins 58 constantly full and communicating a constant load to the diaphragms. Valve casings 59, connecting the tops of the respective chambers 55″ with the bottoms of the respective basins 58, have connected therewith liquid supply pipes 60 and discharge pipes 61 and 62 controlled by valves 63 adapted to reciprocate in the casings, the valves being connected by rods 64 with the diaphragms 56. The fall of the respective valves 63 with their diaphragms 56 connects the pipes 61 with the supply pipes 60 and the elevation of the valves by the diaphragms connects the pipes 62 with the pipes 60. Liquid thus admitted to the pipes 61 and 62, in the respective positions of the valves, acts upon wheels 64, each revolved in opposite directions by the discharge from the respective pipes. Each wheel 64 acts through a shaft 65 with a gear 66 thereon, a gear 67 revolved by the gear 66, a worm shaft 68 revolved by the gear 67, a worm segment 69 operated by the shaft 68, a valve 70 to which the segment 69 is fixed. The respective valves 70 control the flow in conduits 71 having the contracted sections 71′ and the larger sections 71″. The respective sections 71′ are connected by pipes 72 with the bottom chambers 73′ of casings 73 and the respective sections 71″ are connected by pipes 74 with the casing's top chambers 73″, the chambers being separated by respective diaphragms 75 connected by rods 76 with the corresponding diaphragms 56. Levers 77, provided with adjustable poises 78, are connected with the respective rods 76 and balance the diaphragms 56 and 75. When there is a rise in the rate of flow through a conduit 71, the differential pressure communicated to the diaphragm 75 moves the latter downward and this diaphragm acts through the rod 76 and the diaphragm 56 on the valve 63 so as to connect the pipes 60 and 61. Liquid now discharged by the pipe 61 revolves the wheel 64, which acts through the gear train to turn the valve 70 and reduce the flow. When there is a fall in the rate of flow through a conduit 71, the differential pressure communicated to the diaphragm 75 moves it upward and causes it to elevate the valve 63, which effects communication between the pipes 60 and 62. Fluid is now discharged by the pipe 62 against the wheel 64 which acts through the gear train on the valve 70 so as to increase the opening of the latter.

The mechanism illustrated in Fig. 8 provides automatic means for controlling the flow and maintaining uniform distribution under varying conditions, so that, for example, if one or more of several filters connected with a distribution system should be cut off by closing their discharge conduits the flow from the remaining filters through their discharge conduits would be proportionately increased. In this construction, the tank 1, as here shown, is provided with a predetermined head of water by the pipe $2^a$, which is controlled by a valve $3^a$ operated by a float $4^a$ and is adjustable vertically by a rod $5^a$ having an arm $5^b$ connected therewith, the tank overflowing at the predetermined level through a waste pipe $9^a$ which is adjustable vertically by the rod $5^a$ through the arm $5^c$. The bottom of this tank 1 has a flexible overflow pipe $15^a$ connected therewith and with a cord $15^b$, the latter passing over the sheave $15^c$ to a weight $15^d$ for balancing the free end of the pipe. A weighted rod $15^e$ is provided with an arm $15^f$ which engages the cord $15^b$ so as to carry it down against the action of the weight $15^d$, the upward movement of the free end of the pipe being limited to the level of the water in the tank by an engagement of the cord $15^b$ with an arm $5^d$ on the rod $5^a$. The rod $15^e$ is supported by cords $15^j$ and $15^g$ connected with sheaves $15^h$ and $15^i$, the cord $15^g$ having a weight $15^k$ connected therewith and floating in water in the stand pipe $15^l$ and the latter being connected with the clear water well of the filters. If, as through neglect of an attendant, water should rise unduly in the filters, the corresponding rise of the float $15^k$ would lower the outlet end of the pipe $15^a$ and drain the tank 1. The tank 1 has an outlet $10^a$ at or near the bottom thereof which discharges into a tank $11^a$ under a constant head. The tank $11^a$ discharges through a pipe $11^b$ to the header 11' having the pipes 54 (containing stop and waste valves 54') connected therewith and with the bottom chambers 55' of casings 55 containing diaphragms 56, as in Figs. 6 and 7. A pipe 57 connects the casing chamber 55'' above the diaphragm 56 with a basin 58, whose top is level with the inlet to the pipe $11^b$, and a pipe 54'' connects this basin with the pipe 54, the pipe 54'' containing a variable orifice $54^a$ for regulating the flow therethrough. When a gate valve 80 is lowered to close one of the conduits 71, its stem $80^a$ acts through the cord 81 (which passes over the sheaves 82) upon a lever $54^b$ to close the corresponding valve 54', whereupon water in the pipes 54 and 54'' waste therethrough. The result of thus cutting off the discharge through one of the pipes 54 is to increase the head in the tank $11^a$ and the pressure communicated through the remaining pipes 54, which tends to elevate the diaphragms 56 against the constant head thereon from the vessels 58 and the actions thereon of the diaphragms 75 through the stems 76, the latter diaphragms being subject to differential pressures communicated from sections 71' and 71'' of the conduits 71 through the pipes 72 and 74 to the chambers 73' and 73''. The effect is to elevate the valves 63' in the chambers 59' and establish communication between the motive fluid pipes 60 and 61 so that the wheels 64 will be operated to open the valves 70 and permit an increased flow through the operative conduits 71, compensating for the loss of flow through the closed conduit or conduits 71. This increased rate of flow through the individual conduits will be maintained through the automatic regulation of the valves 70, as heretofore described. If the liquid in the tank 1 should fall, due to rise of water in the stand pipe $15^l$, water would fall in the tank $11^a$, the superior pressure communicated to the chambers 55' would be eliminated, the valve 63' would fall, and motive fluid, communicated through the now connected pipes 60 and 62, would act to close the valves 70. A stand 83 is provided with a journaled pinion 84 operated by a handle 85, which revolves a gear nut 86 engaging the thread $5^m$ on the rod $5^a$, the latter moving over the indicating scale 87. By turning the handle, the rod is adjusted vertically, the head in the tank 1 is changed, and the rate of operation is changed accordingly. A float 88 in the tank $11^a$ is connected by an operating device 89 with means 90 for indicating at a central point the flow through all the controllers in service.

Having described my invention, I claim:

1. In a rate controller, the combination of a conduit, means for obtaining differential pressures of a fluid flowing therein, a valve in said conduit, means controlled by said differential pressures for regulating the position of said valve, and fluid pressure mechanism for regulating the action of said means last named.

2. In a rate controller, the combination of a plurality of conduits, valves for controlling the respective conduits, means controlled by fluid flowing in the respective conduits for regulating the positions of the respective valves, and liquid pressure mechanism for regulating the actions of the respective means.

3. In a rate controller, the combination of a plurality of conduits having means for differentiating the pressures of fluid flowing therein, valves for controlling the flow through said conduits, mechanism comprising fluid pressure devices connected with means for operating said valves, and fluid pressure mechanisms for regulating the action of said devices.

4. In a rate controller, the combination of conduits, means for differentiating the pressures of fluid flowing therein, mechanism connected with said means and comprising devices adapted to be reciprocated by variations in said pressures, valves for controlling the flow in said conduits, mechanism controlled by said devices for operating said valves to maintain a desired rate of flow in said conduits, and fluid pressure mechanisms for regulating the movements of said devices from a distant point.

5. In a rate controller, the combination of a plurality of conduits, valves for the respective conduits, mechanisms for regulating the respective valves, a liquid container, and mechanisms whereby pressure is communicated from liquid in said container for regulating the actions of said mechanisms first named.

6. In a rate controller, the combination of a plurality of conduits, valves for regulating the flow through the respective conduits, and mechanism comprising central controlling means for automatically effecting a differential regulation of the actions of the respective valves.

7. In a rate controller, the combination of a plurality of conduits, valves for regulating the flow through the respective conduits, mechanisms operated by liquid pressure from the respective conduits for regulating the operations of the respective valves to control the rates of flow, and mechanism comprising central controlling means for regulating said mechanism first named.

8. In a rate controller, the combination of a plurality of conduits respectively provided with means for differentiating the pressure of fluid flowing therethrough, valves for regulating the rate of flow of fluid through the respective conduits, means comprising fluid pressure devices operated by variations in the resultants of said differential pressures whereby the respective valves are operated, and means comprising a central container from which fluid pressure is communicated to the respective devices aforesaid for regulating the actions of said means first named in operating the respective valves.

9. In a rate controller, the combination of a plurality of conduits respectively provided with means for differentiating the pressure of fluid flowing therethrough, valves for regulating the rate of flow of fluid through the respective conduits, means comprising devices reciprocated by differential pressures communicated from the respective conduits, means for regulating the movements of the respective devices, motor mechanisms for operating the respective valves, means whereby said devices effect the operation of respective motor mechanisms, and means comprising a centrally located mechanism for communicating fluid pressure to and regulating the movements of said devices.

10. In a rate controller, a conduit having means for differentiating the pressure of a fluid flowing therein, a valve for controlling the flow in said conduit, mechanism comprising a motor for operating said valve, mechanism comprising a reciprocating device connected with said means and operated by variations in said pressure for controlling the action of said motor through said mechanism first named, mechanism comprising a second reciprocating device connected in balanced relation with said reciprocating device first named, and fluid pressure means for regulating the action of said device second named.

11. In a rate controller, a plurality of conduits, means comprising valves for regulating the rate of flow in the respective conduits, and master controlling fluid pressure means connected with and differentially regulating the actions of said means first named.

12. In a rate controller, a conduit, means comprising a valve operated by the differential pressure of fluid in said conduit for automatically regulating the flow through said conduit to a predetermined rate, a tank containing liquid, and means connecting said tank with said means first named whereby the pressure of said liquid regulates the action of said means first named.

13. In a rate controller, a conduit having means for differentiating the pressure of a fluid flowing therein, a casing containing a reciprocating device having opposite sides thereof connected with said means whereby said device is movable by changes in the rate of flow, a valve for regulating the flow in said conduit, means controlled by said device for controlling the action of said valve, balancing means connected with said device, a second reciprocating device connected with said device first named, means comprising a tank for transmitting constant liquid pressure to said second named device, and means for varying said constant liquid pressure.

14. In a rate controller, a plurality of conduits respectively provided with means for differentiating the pressures of fluids flowing therein, casings containing reciprocating devices connected with the respective means and adapted to be reciprocated by changes in said pressures, valves for controlling the flow through the respective conduits, means whereby the respective devices automatically regulate the positions of the respective valves, casings provided with reciprocating devices connected with the respective devices first named, means for conveying a constant head of fluid pressure to each of the devices second named, mechanism for regulating said constant head for the respective devices, and a fluid pressure tank for conveying constant pressure to the means last named.

15. In a rate controller, a plurality of conduits, valves for controlling the flow through said conduits, and means whereby a reduction of the flow in one of said conduits proportionately increases the flow through the remaining conduits.

16. In a rate controller, a plurality of conduits, valves for controlling the flow in said conduits, and differential pressure mechanism for controlling said valves, in combination with means whereby a reduction of the flow in one of said conduits increases the flow through the remaining conduits.

17. In a rate controller, a plurality of conduits, and means whereby a reduction of the flow in one of said conduits increases the flow in the remaining conduits, said means comprising fluid pressure mechanism whereby the closure of one of said conduits increases the openings of the remaining conduits.

18. In a rate controller, a plurality of conduits, valves for controlling the flow through said conduits, means for operating said valves, differential pressure mechanism whereby fluid flowing in said conduits operates said valves, and fluid pressure mechanism whereby a reduction of flow in one of said conduits automatically increases the flow in the remaining conduits.

19. In a rate controller, a conduit, a valve for regulating the flow in said conduit, means controlled by the differential pressures of fluid in said conduit for regulating said valve, and fluid pressure means for regulating the action of said means first named, said fluid pressure means comprising a casing, a device adapted to reciprocate in said casing, and means for communicating differential pressures to said device.

20. In a rate controller, a conduit, a valve for regulating the flow in said conduit, means controlled by differential pressures of fluid in said conduit for regulating said valve, and fluid pressure means for regulating the action of said means first named, said fluid pressure means comprising a casing, a device adapted to reciprocate in said casing, means for applying a constant pressure to said device, and means for applying a variable opposing pressure to said device.

21. In a rate controller, a conduit, a valve in said conduit, and means for automatically regulating the action of said valve, said means comprising a casing, a device adapted to reciprocate in said casing, a liquid container, and means whereby liquid in said container communicates opposing constant and variable pressures to said device.

22. In a rate controller, a conduit, a valve in said conduit, and means for automatically regulating the action of said valve, said means comprising a casing, a device adapted to reciprocate in said casing, a liquid container, means whereby liquid in said container communicates opposing pressures to said device, means whereby one of said pressures is maintained constant, and means for varying the head of liquid in said container and the pressure opposing the constant pressure.

23. In a rate controller, a conduit, and means for automatically regulating the flow in said conduit, said means comprising a reciprocating device, a liquid container, means whereby liquid in said container communicates opposing pressures to said device, means whereby one of said pressures is maintained constant, and means for automatically varying the head of liquid in said container whereby the pressure opposed to said constant pressure is varied.

24. In a flow controller, a plurality of conduits, valves for regulating the flow through said conduits, differential pressure mechanism for regulating the actions of said valves, and valves in said conduits for controlling the actions of said differential pressure mechanism whereby the closure of a conduit by one of said valves last named effects the opening of the remaining conduits by the operation of their valves first named.

25. In a flow controller, a plurality of conduits, valves for controlling said conduits, differential pressure mechanism comprising reciprocating devices for automatically regulating the actions of said valves, other valves for controlling said conduits, a liquid container, means for communicating liquid pressures from said container to opposite sides of each of said devices, means whereby the closure of one of said valves second named cuts off the flow from said container to the device connected with the corresponding conduit, and means whereby the head of liquid in said container and the resultant pressure on the remaining devices is thereby increased.

26. In a flow controller, a conduit, a valve for regulating the flow in said conduit, and fluid pressure mechanism for regulating the action of said valve, said mechanism comprising a liquid container, a second liquid container adapted for discharging liquid into said first container at a regular rate under a predetermined head, a third liquid container, and means whereby the head of liquid in said third container automatically controls the head of liquid in said second container.

27. In a flow controller, a conduit, valves for controlling the flow through said conduit, differential fluid pressure mechanism comprising a liquid container and pipe for regulating the action of one of said valves, means operated by the other of said valves for closing said pipe, and means for delivering liquid at a constant rate to said container.

28. In a rate controller, a plurality of conduits respectively provided with means for differentiating pressures of fluids flowing therein, valves for controlling the flow through said conduits, means whereby said differential pressures control said valves, means comprising reciprocating devices connected with said means last named, and a tank whose supply is connected with said reciprocating devices so that the flow from said tank is in a direct ratio to the flow through said conduits.

29. In a rate controller, a plurality of conduits respectively provided with means for differentiating pressures of fluids flowing therein, devices connected with the respective means and adapted to be reciprocated by changes in said pressures, reciprocating devices for balancing said devices first named, a tank, means whereby pressures from said tank reciprocate said device second named, and means for indicating the rate of flow.

In testimony whereof I have hereunto set my name this 2nd day of March, 1915, in the presence of the subscribing witnesses.

MORO M. BORDEN.

Witnesses:
MARJORY D. GRAF,
JOS. Z. DENNY.